(12) United States Patent
Kim et al.

(10) Patent No.: US 12,475,192 B1
(45) Date of Patent: Nov. 18, 2025

(54) METHOD AND APPARATUS FOR LIGHTWEIGHTING OF ARTIFICIAL INTELLIGENCE MODEL USING DEQUANTIZATION

(71) Applicant: SqueezeBits Inc., Seoul (KR)

(72) Inventors: Hyungjun Kim, Seoul (KR); Taesu Kim, Seoul (KR)

(73) Assignee: SqueezeBits Inc., Seoul (KR)

( * ) Notice: Subject to any disclaimer, the term of this patent is extended or adjusted under 35 U.S.C. 154(b) by 0 days.

(21) Appl. No.: 19/011,658

(22) Filed: Jan. 7, 2025

(30) Foreign Application Priority Data

Feb. 21, 2024 (KR) ........................ 10-2024-0025263

(51) Int. Cl.
G06F 17/16 (2006.01)
G06N 3/0495 (2023.01)
H03M 7/24 (2006.01)

(52) U.S. Cl.
CPC ............ G06F 17/16 (2013.01); G06N 3/0495 (2023.01); H03M 7/24 (2013.01)

(58) Field of Classification Search
CPC ........ G06F 17/16; G06N 3/0495; G06N 5/04; H03M 7/24
See application file for complete search history.

(56) References Cited

U.S. PATENT DOCUMENTS

| | | | | |
|---|---|---|---|---|
| 2021/0125070 | A1* | 4/2021 | Wang | G06N 3/04 |
| 2023/0185570 | A1* | 6/2023 | Kerr | G06F 12/0888 |
| | | | | 712/225 |
| 2024/0070223 | A1* | 2/2024 | Yan | G06F 17/16 |
| 2025/0053454 | A1* | 2/2025 | Gerogiannis | G06F 17/16 |
| 2025/0217651 | A1* | 7/2025 | Park | G06N 3/082 |

OTHER PUBLICATIONS

Guo, Han, et al. "Fast matrix multiplications for lookup table-quantized llms." arXiv preprint arXiv:2407.10960 (2024). (Year: 2024).*
Kim, Taesu, et al. "QUICK: Quantization-aware Interleaving and Conflict-free Kernel for efficient LLM inference." arXiv preprint arXiv:2402.10076 (2024). (Year: 2024).*
KIPO, Notice of Refusal to Grant a Patent for Application No. 10-2024-0025263, Mar. 19, 2024.
KIPO, Decision to Grant a Patent for Korean Patent Application No. 10-2024-0025263, Oct. 21, 2024.
Shiyang Chen, Tango: rethinking quantization for graph neural network training on GPUs, Proceedings of the International Conference for High Performance High Performance Computing, Networking, Storage and Analysis, Nov. 11, 2023.
Qingchang Han, Extremely Low-bit Convolution Optimization for Quantized Neural Network on Modern Computer Architectures, Proceedings of the 49th International Conference on Parallel Processing, Aug. 17, 2020.

* cited by examiner

*Primary Examiner* — Matthew D Sandifer
(74) *Attorney, Agent, or Firm* — Nicholas Park

(57) ABSTRACT

The disclosure relates to a method and an apparatus for lightweighting of artificial intelligence models, and a method of performing matrix multiplication of weight values and input values of artificial intelligence models includes copying quantized weight values stored in a global memory to a register, dequantizing the quantized weight values, copying an input value matrix to the register, and performing matrix multiplication between a dequantized weight value matrix and the input value matrix.

10 Claims, 10 Drawing Sheets

↓ APPLY MATRIX MULTIPLICATION WEIGHT STORAGE PATTERN

```
0 10 20 30 40 50 60 70
1 11 21 31 41 51 61 71
2 12 22 32 42 52 62 72
3 13 23 33 43 53 63 73
4 14 24 34 44 54 64 74
5 15 25 35 45 55 65 75
6 16 26 36 46 56 66 76
7 17 27 37 47 57 67 77
```
602

↓ APPLY DEQUANTIZATION PATTERN

```
30 20 10  0 70 60 50 40
31 21 11  1 71 61 51 41
32 22 12  2 72 62 52 42
33 23 13  3 73 63 53 43
34 24 14  4 74 64 54 44
35 25 15  5 75 65 55 45
36 26 16  6 76 66 56 46
37 27 17  7 77 67 57 47
```
603

METHOD AND APPARATUS FOR LIGHTWEIGHTING OF ARTIFICIAL INTELLIGENCE MODEL USING DEQUANTIZATION

CROSS REFERENCE TO RELATED APPLICATION

The present application claims priority to Korean Patent Application No. 10-2024-0025263, filed on Feb. 21, 2024, the entire contents of which is incorporated herein for all purposes by this reference.

BACKGROUND OF THE INVENTION

Field of the Invention

The disclosure relates to a method and an apparatus for lightweighting of artificial intelligence models and, more particularly, to a method and an apparatus for storing quantized weights of artificial intelligence models.

Description of Related Art

A large language model (LLM) is a type of artificial intelligence models that process natural language data and corresponds to an artificial intelligence model that generates responses similar to those generated by humans. The LLM is constructed using a deep learning technology and may be trained using a huge amount of text data. The LLM has recently attracted a lot of attention in a natural language processing field, and a representative LLM is a chat generative pre-trained transformer (GPT)-3.

The LLM is trained using a huge amount of learning data sets and thus understands the structure and meaning of language. The LLM has a capability of detecting a pattern of text and a language rule and generating or understanding new text, based thereon. By using such a characteristic, the LLM may be used for various purposes of machine translation, automatic text summarization, question and answer, dialog system, content generation, and the like.

SUMMARY OF THE INVENTION

The disclosure intends to provide a method and an apparatus for lightweighting of artificial intelligence models.

Further, the disclosure intends to provide a method and an apparatus for efficiently using quantized weights of artificial intelligence models.

In addition, the disclosure intends to provide a method and an apparatus for efficiently storing quantized weights of artificial intelligence models.

The disclosure according to an embodiment of the disclosure relates to a method of performing matrix multiplication of weight values and input values of artificial intelligence models and includes copying quantized weight values stored in a global memory to a register, dequantizing the quantized weight values, copying an input value matrix to the register, and performing matrix multiplication between a dequantized weight value matrix and the input value matrix.

The disclosure according to an embodiment of the disclosure relates to a method of dequantizing the quantized weight values and includes converting each of the quantized weight values expressed by a first number of bits to be expressed by a second number of bits and changing order of the weight values expressed by the second number of bits according to a dequantization pattern.

The disclosure according to an embodiment of the disclosure relates to the dequantization pattern and includes a configuration defined to separate values into at least one section and inversely rearrange the values in each section.

The disclosure according to an embodiment of the disclosure relates to the dequantization pattern and includes a configuration defined to move a first value to a fourth value, a second value to a third value, the third value to the second value, a fourth value to the first value, a fifth value to an eighth value, a sixth value to a seventh value, the seventh value to the sixth value, and the eighth value to the fifth value.

The disclosure according to an embodiment of the disclosure relates to quantized weight values stored in the global memory and includes a configuration stored after rearrangement according to an inverse pattern of the dequantization pattern or an inverse pattern of a data input pattern applied when the weight values are copied from the shared memory to the register.

The disclosure according to an embodiment of the disclosure relates to the inverse pattern of the dequantization pattern and includes a configuration defined to separate values included in one row into at least one section and inversely rearrange the values in each section.

The disclosure according to an embodiment of the disclosure relates to the inverse pattern of the data input pattern and includes a configuration defined to change rows and columns of values included in a matrix.

The disclosure according to an embodiment of the disclosure relates to a method of storing weight values of artificial intelligence models and includes quantizing weight values, identifying a storage pattern of the quantized weight values based on at least one of a data input pattern and a dequantization pattern for matrix multiplication, and storing the quantized weight values according to the identified storage pattern.

The disclosure according to an embodiment of the disclosure relates to an apparatus for performing matrix multiplication of weight values and input values of artificial intelligence models and includes a storage unit and a processor. The processor is configured to copy quantized weight values stored in a global memory to a register, dequantize the quantized weight values, copy an input value matrix to the register, and perform matrix multiplication between a dequantized weight value matrix and the input value matrix.

The disclosure according to an embodiment of the disclosure relates to an apparatus for storing weight values of artificial intelligence models and includes a storage unit and a processor. The processor is configured to quantize weight values, identify a storage pattern of the quantized weight values, based on at least one of a data input pattern and a dequantization pattern for matrix multiplication, and store the quantized weight values according to the identified storage pattern.

The disclosure may provide a method and an apparatus for determining the kernel size for changing the structure of artificial intelligence models, so as to effectively use lightweight artificial intelligence models.

BRIEF DESCRIPTION OF THE DRAWINGS

FIG. 6 illustrates an example of a storage pattern of quantized weights according to an embodiment of the disclosure.

DETAILED DESCRIPTION OF THE INVENTION

Figure 1:
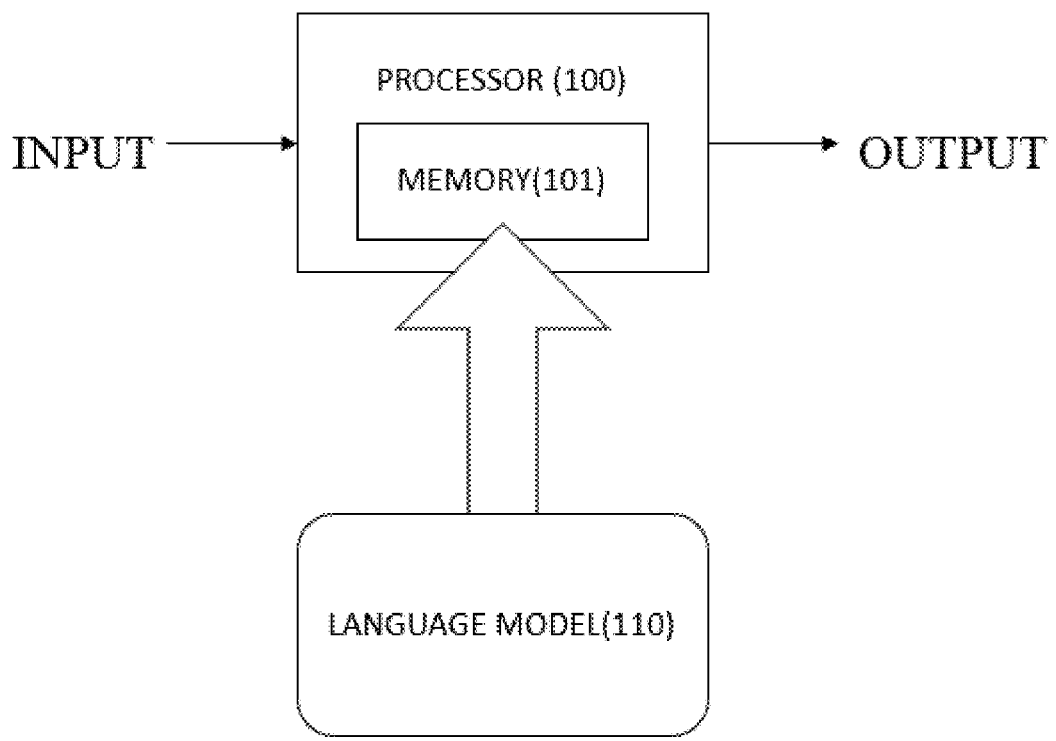
FIG. 1 illustrates an example of a situation in which an artificial intelligence model is uploaded to a processor.

The advantages and features of the disclosure, and methods for achieving the same may become clearer with reference to embodiments described in detail along with the accompanying drawings. However, the disclosure is not limited to embodiments suggested below, but may be implemented in various different forms and should be understood as including all transforms included in the idea and technical range of the disclosure, equivalents, and substitutes.

Embodiments suggested below make the disclosure complete and are provided to completely inform those skilled in the art to which the disclosure belongs of the range of the disclosure. In description of the disclosure, when it is determined that the detailed description of the relevant known art may obscure the gist of the disclosure, detailed description thereof will be omitted.

The terms used in this application is used to describe particular embodiments only and is not intended to be limiting of the disclosure. Singular forms include plural forms unless the context clearly indicates otherwise. In this application, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In an embodiment of the disclosure, "communication", "communication network", and "network" may be used as the same meaning. The three terms may include a wired/wireless short-range and wide-area data transmission and reception network which may transmit and receive files between user terminals, terminals of different users, and download servers.

Hereinafter, embodiments of the disclosure are described in detail with reference to the accompanying drawings, the same reference numeral is assigned to the same or corresponding element in description made with reference to the accompanying drawings, and overlapping description thereof is omitted.

A language model that is one type of artificial intelligence models has the excellent performance in language generation and various fields based on the large model size and data. Despite the good performance, the language model cannot be uploaded to one of graphic processing units (GPUs) for general users and GPUs for some servers due to high memory requirements.

FIG. 1 illustrates an example of a situation in which an artificial intelligence model is uploaded to a processor according to an embodiment of the disclosure. Referring to FIG. 1, when a language model 110 is uploaded to an internal memory 101 of a processor 100 (for example, a GPU), the processor 100 may perform an inference or prediction operation of generating output data from input data by using the language model 110. However, when an amount of data of the language model 110 is larger than a storage capacity of the memory 101, the processor 100 cannot use the language model 110 alone, and interworking of a plurality of processors is needed. However, when a plurality of processors interworks, resource consumption and delay for communication between the processors may be generated.

Figure 2:
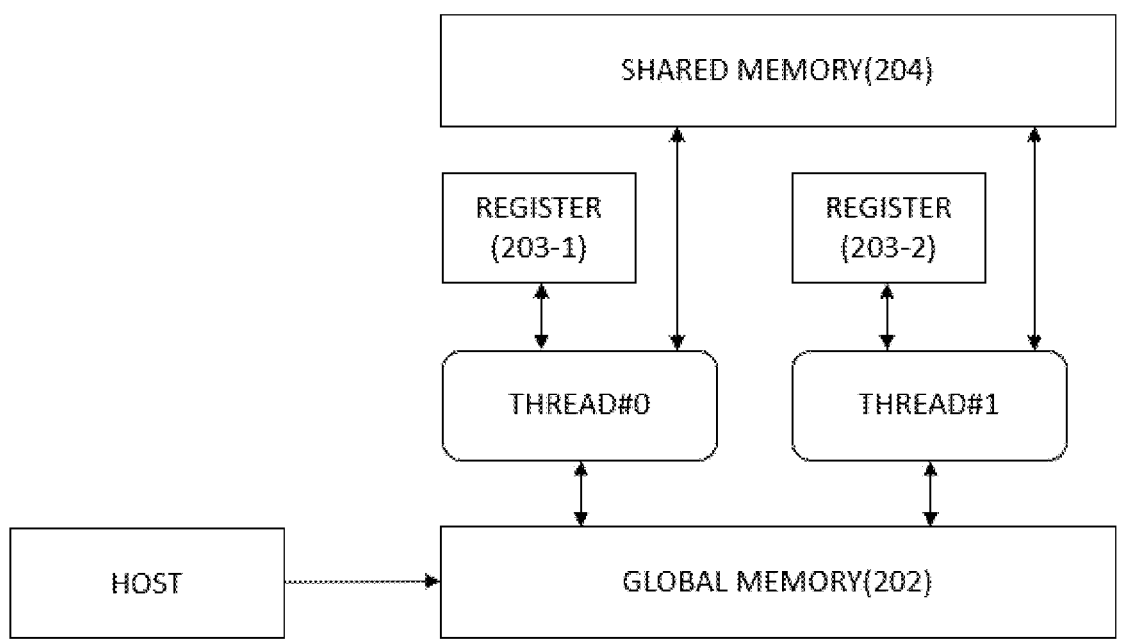
FIG. 2 illustrates an example of a structure of a graphic processing unit (GPU) using a shared memory.

Meanwhile, the widely used GPU adopts the structure of a shared memory to reduce memory access cost between calculations. The structure of the shared memory is as shown in FIG. 2. FIG. 2 illustrates an example of the structure of a GPU using a shared memory. A global memory 202 is an on-board memory. The global memory 202 exists outside a GPU chip in a graphic card, and thus a memory access speed is relatively slower than a register or a shared memory. The global memory 202 may be implemented as a dynamic random access memory (DRAM). A register 203-1 or 203-2 is an on-chip memory and corresponds to the fastest memory supporting direct calculation. FIG. 2 shows an example of the structure including two registers 203-1 and 203-2, but the number of registers may vary. The shared memory 204 is an on-chip memory and corresponds to a memory for data sharing between a plurality of threads within the same block. The shared memory 204 supports the threads within the block to communicate and cooperate in performing computation, and since the shared memory physically resides on the GPU, it has a shorter access delay time compared to the global memory 202.

In an inference process, most of the memory usage occurs by the part that the memory should have model weights during calculations. Accordingly, it is required to reduce the capacity occupied by the model weights in the memory. As a representative method of reducing the capacity of the model weights, there is a method of reducing bit precision of weights, for example, a quantization method. When 16 bit/parameter (fp16) corresponding to the generally used bit precision is reduced to 3 bit/parameter, the storage space becomes about ⅕ compared to fp16.

Figure 3:
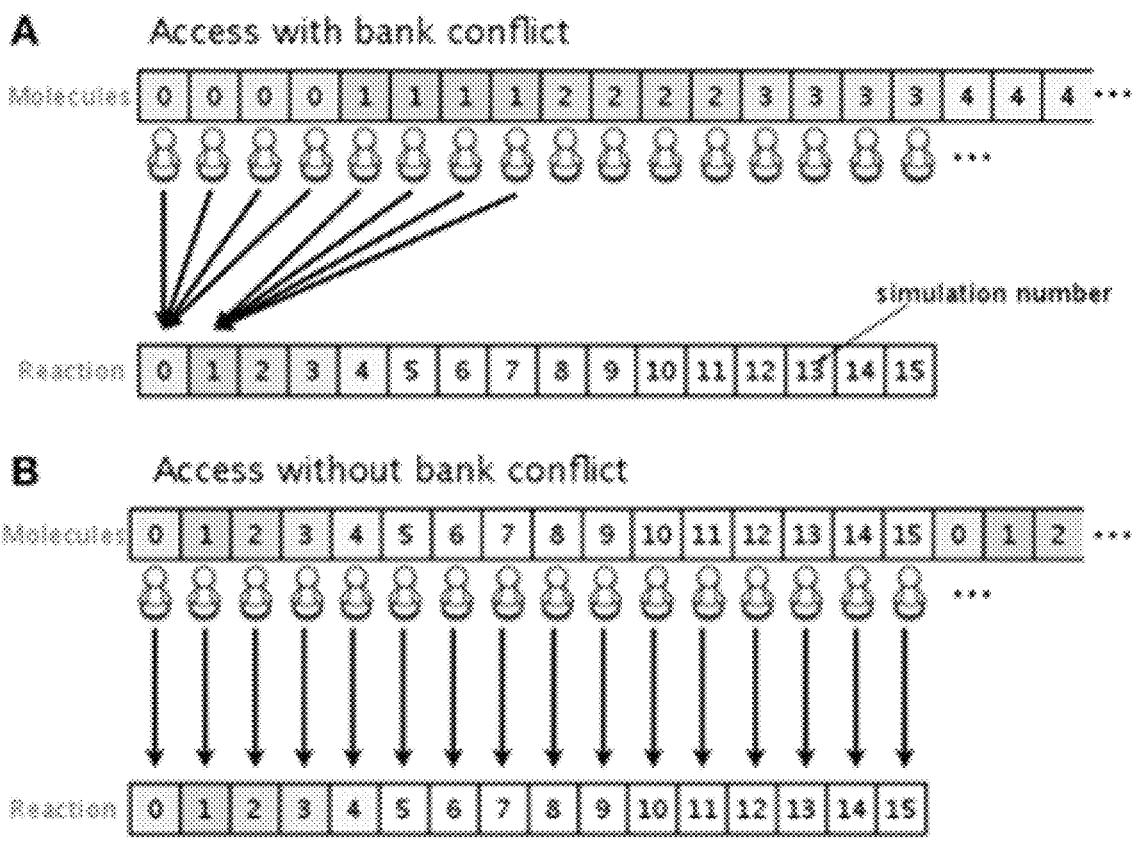
FIG. 3 illustrates an example of bank conflict in the shared memory.

However, when the bit precision is reduced, the number of weight values read by the same memory bandwidth once may become larger. Each of the weight values may be stored in the shared memory after decoded to fp16, in which case bank conflict may be generated and a storage speed may become drastically slow. In the shared memory of the GPU, each address is allocated to one of various banks, and storage or access to one piece of data is possible per bank in one cycle. Accordingly, when it is attempted to store two or more values in the same bank, one cycle stall may occur, which is called bank conflict. The concept of bank conflict is as illustrated in FIG. 3.

The global memory implemented as the DRAM has high access latency and power consumption, which makes it difficult to access the global memory every time. When data to which access should be performed several times during the calculation process is copied to the shared memory within the GPU operator and then accessed, it is possible to reduce total data access cost. Several threads performing the parallel calculation can simultaneously access the shared memory, but there is data read/write condition. Consecutive addresses in the shared memory are allocated to N (different depending on the GPU type, for example, 16) banks, and, when several threads access the same bank in one cycle, the threads wait and operate for one cycle at a time. Since the GPU is sensitive to optimization of relative importance of memory access/calculation, it may be required to explicitly optimize the same.

In general, for matrix calculation (for example, Tensor core calculation), data is copied in the order of a global memory, a shared memory, and a register. At this time, copying from the global memory to the shared memory is the slowest. In order to minimize bank conflict as much as possible, permutated loading may be performed when data stored in the global memory is stored in the shared memory. The permutated loading means that values stored in the global memory in the column-major order are read and stored in the row-major order. Thereafter, when data is copied from the shared memory to the register, hardware and instructions according thereto are implemented to normally perform the calculation even though the data is input according to a permutation pattern.

However, when weights are quantized, the following problems may occur. Quantized weight values are stored in the global memory according to the permutation pattern for the shared memory, and the quantized weight values read from the global memory are dequantized and stored in the shared memory. Thereafter, the dequantized weight values are copied to the register and used for the inference calculation. During such a process, more bank conflicts may be generated compared to the case where non-quantized weight values are stored during a storage process in the shared memory after the weight values are dequantized and, accordingly, longboard stall that occurs due to non-preparation of data for the calculation may increase during a process of performing the real calculation.

Accordingly, the disclosure proposes a technology for storing, in the global memory, and managing weight values quantized in the form that can be directly stored in and used by the register without storing the dequantized weight values in the shared memory in order to prevent bank conflict generated due to the use of the shared memory for storing the dequantized weight values. That is, the disclosure proposes a technology for significantly reducing bank conflict in the shared memory and improving the delay by changing a storage pattern of the quantized weight values.

According to the disclosure, for the matrix calculation, data (for example, weight values) is copied from the global memory to the register. Since a process of copying data from the global memory to the shared memory is excluded, bank conflict may be resolved. To this end, an apparatus rearranges quantized weight values in consideration of a storage pattern in the register when data is copied sequentially in the order of the global memory, the shared memory, and the register, and then stores the rearranged data in the global memory.

In other words, for an N-parallel operator having a memory hierarchy for reducing memory access costs, that is, the delay time and power, the disclosure proposes a storage pattern of quantized weight values to efficiently perform the matrix multiplication calculation using the quantized weight values. In other words, the disclosure proposes a weight storage pattern that simultaneously reflects a data input pattern of the N-parallel operator and a dequantization pattern of the quantized weight values. The dequantization pattern may vary depending on a quantization technology and an implementation method of calculation code (for example, kernel) for dequantization of the corresponding quantization technology. The following proposed technology is not limited to a specific type or model of GPU, and may be applied to various operators and quantization technologies.

Hereinafter, the disclosure describes the general process of dequantization and matrix calculation as an example, and describes a storage pattern of quantized weight values according to the proposed technology and the calculation operation using the corresponding storage pattern of quantized weight values.

Figure 4:
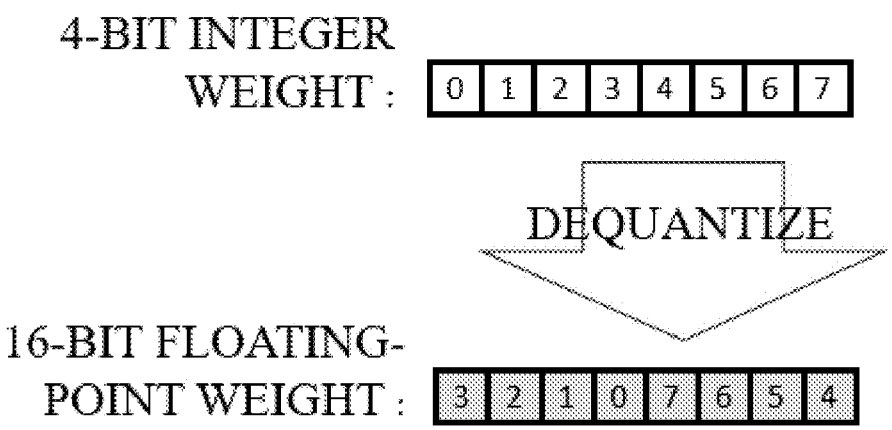
FIG. 4 illustrates an example of a dequantization pattern of weight values.

FIG. 4 illustrates an example of a dequantization pattern of weight values. FIG. 4 illustrates an example of the case where 16-bit floating-point weight values are quantized to a 4-bit integer and then dequantized again. As illustrated in FIG. 4, eight 4-bit weights are stored in the form of one 32-bit integer. At this time, during dequantization, the dequantization is performed in a pattern of [3, 2, 1, 0, 7, 6, 5, 4]. As a result, from the input of one 32-bit integer, eight 16-bit floating-point weights according to the pattern may be generated. The dequantization pattern [3, 2, 1, 0, 7, 6, 5, 4] is an example, and may vary depending on a detailed quantization/dequantization technology.

Figure 5:
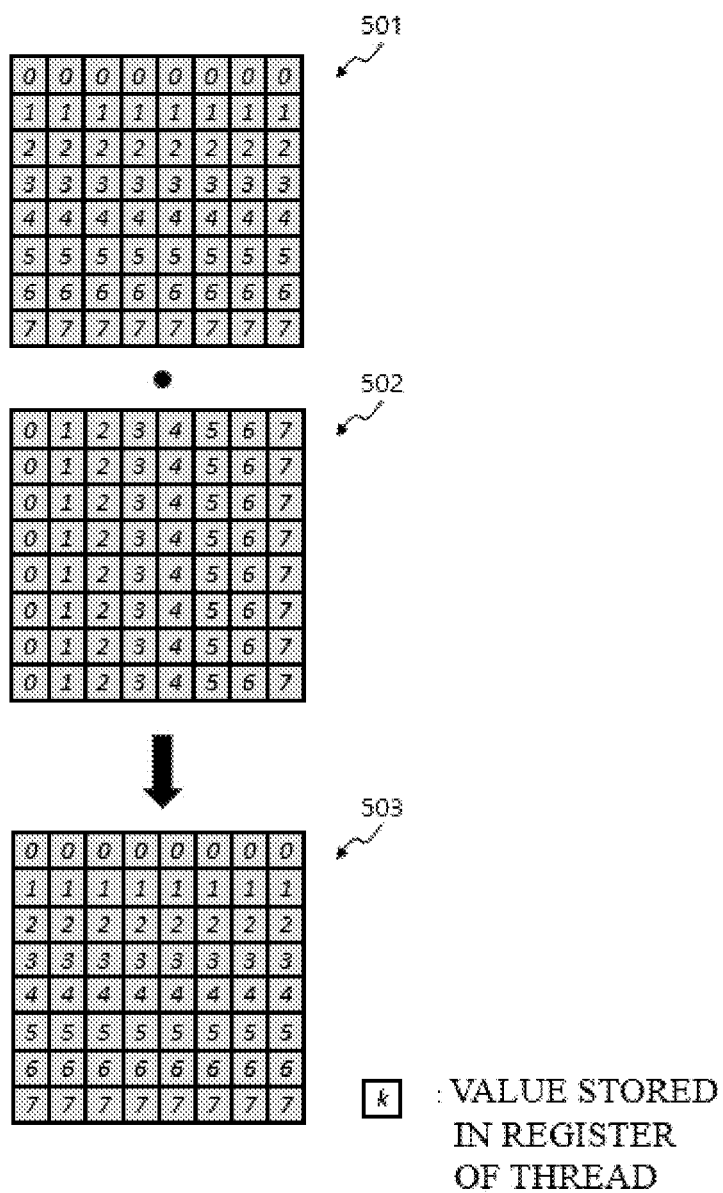
FIG. 5 illustrates an example of a matrix multiplication calculation of a 8-parallel operator.

FIG. 5 illustrates an example of a matrix multiplication calculation of a 8-parallel operator. FIG. 5 shows an example in which data is copied and matrix multiplication is performed according to memory hierarchy of a global memory, a shared memory, and a register. The 8-parallel operator performs calculations by using a register value allocated to each thread. The shared memory has four banks, and when different threads access the same bank, bank conflict is generated. As illustrated in FIG. 4, after dequantization is performed, matrix multiplication between a 8×8 16-bit floating-point input matrix stored in a register of each thread and a 8×8 16-bit floating-point weight matrix is performed. At this time, the register for each thread stores data as illustrated in FIG. 5. As illustrated in FIG. 5, a 16-bit floating-point input 501 is stored in a row-major direction for each thread, a 16-bit floating-point weight 502 is stored in a column-major direction for each thread, and a 16-bit floating-point output 503 is stored in a row-major direction for each thread. To this end, weight values are read and written from the shared memory to the register in a column-major direction. Input values are read and written from the global memory to the register. Then, the matrix multiplication calculation is performed.

As described above, a dequantization weight matrix is stored in the shared memory. Since 4-bit weight values are dequantized to 16-bit weight values, four times as many weight values are generated per unit memory access. When the shared memory has four banks, eight threads generate 8×4 16-bit weight values and attempt to store the same in the four banks, and thus 32/4=8 bank conflicts may be generated. Therefore, according to the disclosure, weight values quantized in the following pattern may be stored.

According to an embodiment of the disclosure, the quantized weight matrix is read and written from the global memory to the register. Further, the weight matrix is dequantized. Subsequently, after input values are read and written from the global memory to the register, the matrix multiplication calculation is performed. The result of the matrix multiplication calculation is stored in the global memory. When dequantization and matrix multiplication are performed according to the patterns illustrated in FIGS. 4 and 5, a storage pattern according to the disclosure may be defined as illustrated in FIG. 6.

Figure 6:
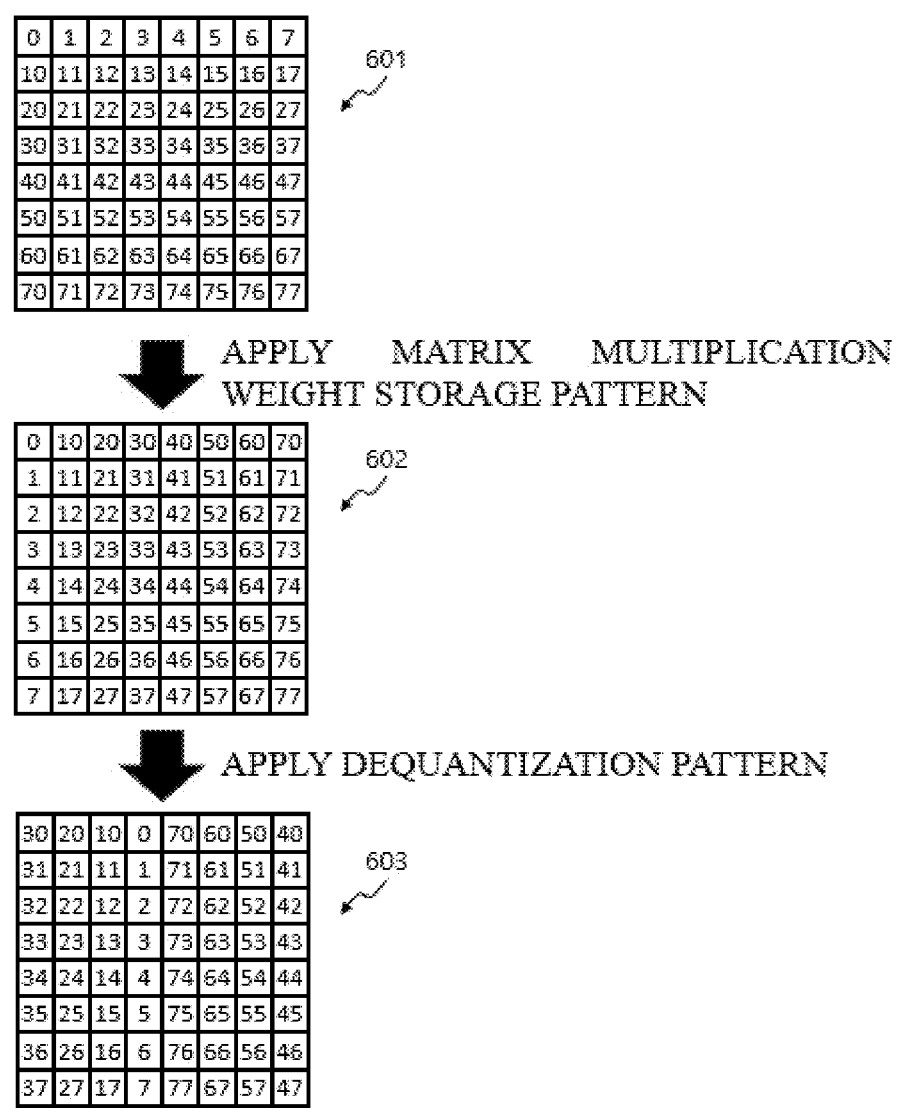

FIG. 6 illustrates an example of a storage pattern of quantized weights according to an embodiment of the disclosure. Referring to FIG. 6, when a matrix multiplication weight storage pattern is first applied to original 4-bit integer weight values 601, dequantization pattern-aware 4-bit integer weight values 602 are acquired. It is identified that rows of the original 4-bit integer weight values 601 are changed to columns of the dequantization pattern-aware 4-bit integer weight values 602. That is, the original 4-bit integer weight values 601 and the dequantization pattern-aware 4-bit integer weight values 602 have the relation of a transpose matrix. Thereafter, when the dequantization pattern is applied to the dequantization pattern-aware 4-bit integer weight values 602, final 4-bit integer weight values 603 are acquired. In the dequantization pattern-aware 4-bit integer weight values 602, there is no change between rows, but the order between columns is reversed to the dequantization pattern, that is, a first column moves to a fourth column, a second column moves to a third column, the third column moves to the second column, the fourth column moves to the first column, a fifth column moves to an eighth column, a sixth column moves to a seventh column, the seventh column moves to the sixth column, and the eighth column moves to the fifth column. According to such a storage pattern, access to the shared memory may be excluded during the dequantization and the matrix multiplication, and thus bank conflict may be resolved. The above-described storage pattern is an example, and the storage pattern may vary widely. The dequantization and the matrix multiplication according to an embodiment of the disclosure are as illustrated in FIG. 7.

Figure 7:
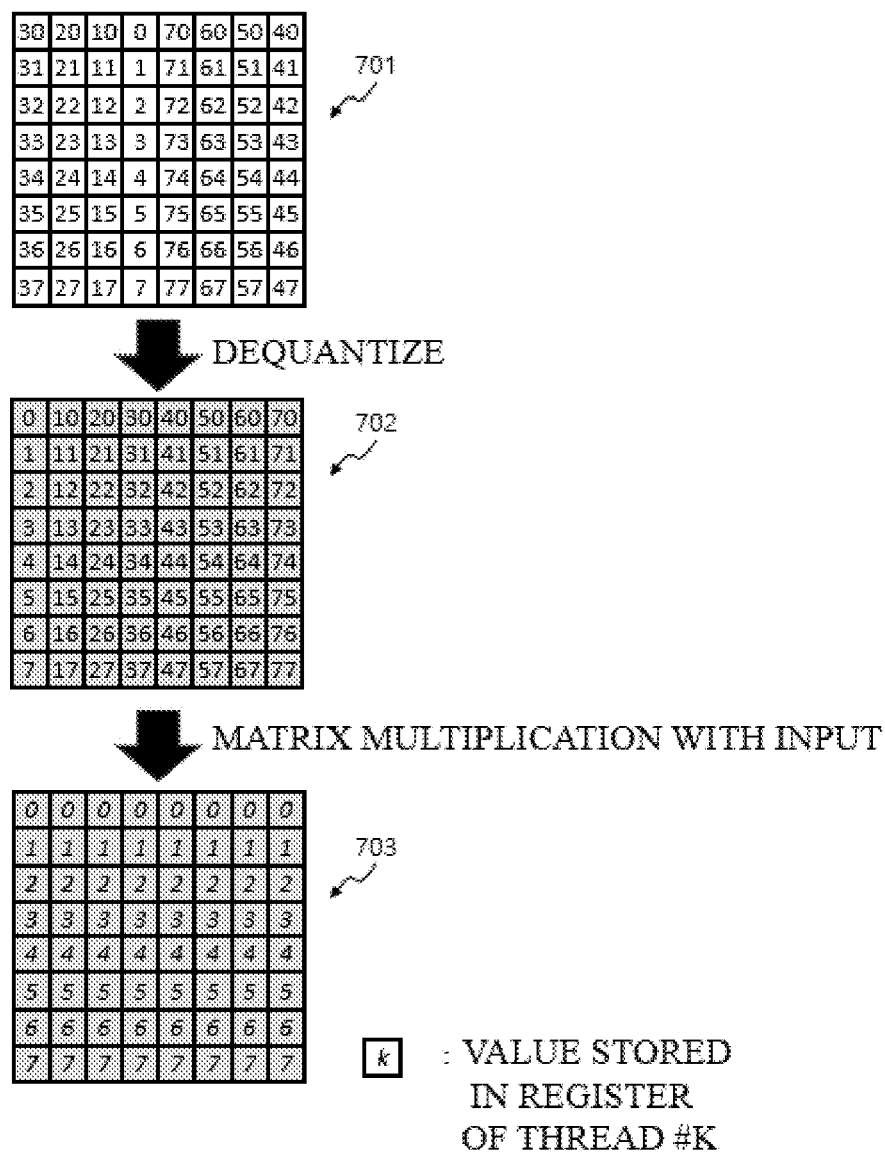
FIG. 7 illustrates an example of dequantization and matrix multiplication according to an embodiment of the disclosure.

FIG. 7 illustrates an example of dequantization and matrix multiplication according to an embodiment of the disclosure. Referring to FIG. 7, a quantized weight matrix 701 stored in the global memory is stored in the register and dequantized without passing through the shared memory. A dequantized 16-bit floating-point weight matrix 702 is matrix-multiplied by input values loaded to the register, and a 16-bit floating-point output value matrix 703 acquired as the result of the matrix multiplication is stored in the global memory.

Figure 8:
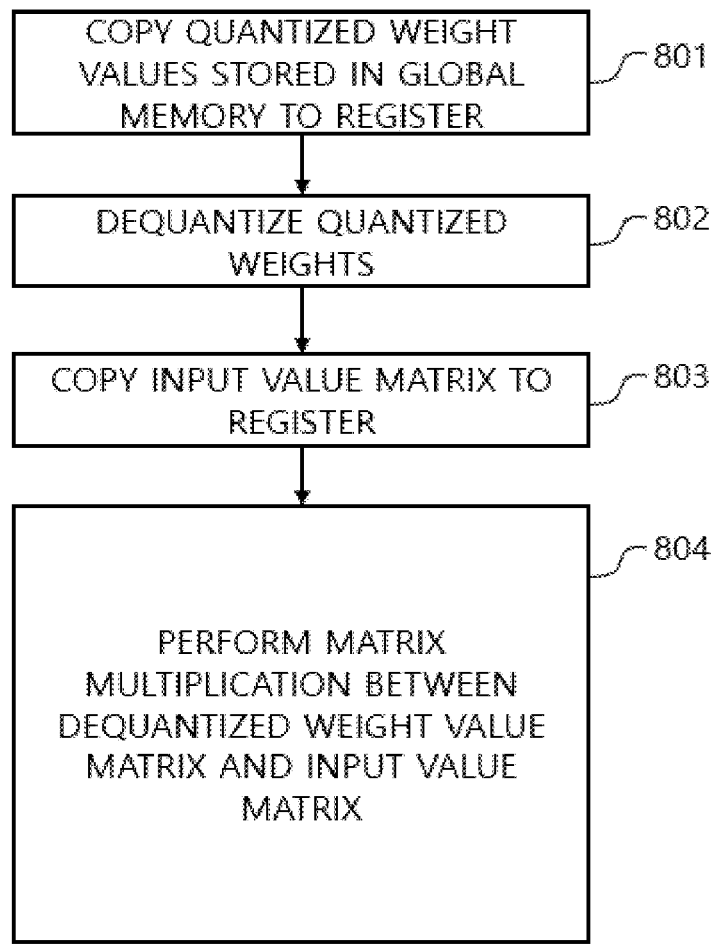
FIG. 8 is a flowchart illustrating a method of performing matrix multiplication of weight values and input values of artificial intelligence models according to an embodiment of the disclosure.

(Embodiment 1-1) FIG. 8 is a flowchart illustrating a method of performing matrix multiplication of weight values and input values of artificial intelligence models according to an embodiment of the disclosure. Referring to FIG. 8, a method of performing matrix multiplication of weight values and input values of artificial intelligence models includes a step 801 of copying quantized weight values stored in a global memory to a register, a step 802 of dequantizing the quantized weights, a step 803 of copying an input value matrix to the register, and a step 804 of performing matrix multiplication between a dequantized weight value matrix and the input value matrix. The flowchart of FIG. 8 may be applied to one layer in artificial intelligence models. Accordingly, when an artificial intelligence model is constituted by a plurality of layers, the method of FIG. 8 may be repeatedly applied to at least some of the plurality of layers.

(Embodiment 1-2) In FIG. 8, a step 802 of dequantizing the quantized weight values includes a step of converting each of the quantized weight values expressed by a first number of bits to be expressed by a second number of bits and a step of changing order of the weight values expressed by the second number of bits according to a dequantization pattern. The second number is larger than the first number and, for example, the first number may be 4 and the second number may be 16. The dequantization pattern changes the order of values, and the dequantization pattern may be applied for each column of the matrix. In a concrete example, the dequantization pattern may be defined to separate values into at least one section and inversely rearrange the values in each section. In a more concrete example, the dequantization pattern may be defined to move a first value to a fourth value, a second value to a third value, the third value to the second value, a fourth value to the first value, a fifth value to an eighth value, a sixth value to a seventh value, the seventh value to the sixth value, and the eighth value to the fifth value.

(Embodiment 2-1) For matrix multiplication as illustrated in FIG. 8, quantized weight values before loaded to the register may be stored according to a storage pattern determined in consideration of a data input pattern of a parallel operator and a dequantization pattern of quantized weight values. Here, the quantized weight value means a weight value which is quantized by a smaller number of bits (for example, 4 bits) than a weight value (for example, 16 bits) used for the matrix calculation and stored in a form that needs dequantization for the calculation. That is, prior to the matrix multiplication as illustrated in FIG. 8, in consideration of at least one of i) a data input pattern of a matrix multiplier (for example, a parallel operator) and ii) a dequantization pattern of quantized weight values, a procedure of storing the quantized weight values should be performed according to a storage pattern of inversely applying at least one of the data input pattern and the dequantization pattern. In other words, for the original quantized weight value matrix (for example, 601 of FIG. 6) quantized without any change of the order of values in the original weight value matrix according to the layer structure of the artificial intelligence model, it is required to change the storage order of elements according to a storage pattern defined to include at least one of an inverse pattern of the data input pattern and an inverse pattern of the dequantization pattern. For example, each of the inverse pattern of the data input pattern and the inverse pattern of the dequantization pattern may include at least one of a change (for example, transpose) between rows and columns, movement of at least one column, movement of at least one row, and the linear operation of element values in the same column or row.

Figure 9:
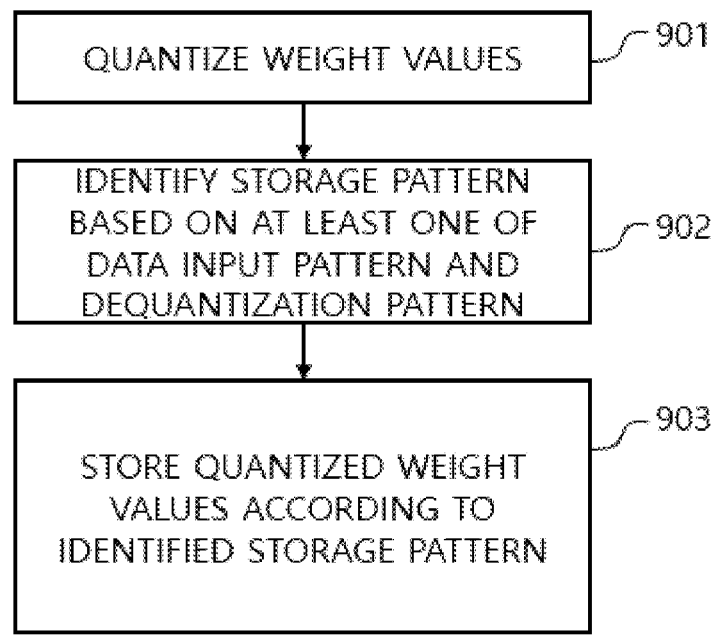
FIG. 9 is a flowchart illustrating a method of storing weight values of artificial intelligence models according to an embodiment of the disclosure.

FIG. 9 is a flowchart illustrating a method of storing weight values of artificial intelligence models according to an embodiment of the disclosure. Referring to FIG. 9, the method of storing weight values of artificial intelligence models includes a step 901 of quantizing weight values, a step 902 of identifying a storage pattern based on at least one of a data input pattern and a dequantization pattern, and a step 903 of storing the quantized weight values according to the identified storage pattern.

(Embodiment 2-2) In FIG. 9, the step 903 of storing the quantized weight values according to the identified storage pattern includes a step of identifying an inverse pattern of the data input pattern for matrix multiplication and a step of rearranging weight values according to the identified inverse pattern. In a concrete example, the inverse pattern of the data input pattern for matrix multiplication may be defined to change rows and columns of values included in the matrix.

(Embodiment 2-3) In FIG. 9, a step 903 of storing quantized weight values according to the identified storage pattern includes a step of identifying an inverse pattern of the dequantization pattern and a step of rearranging the weight values according to the identified inverse pattern. In a concrete example, the inverse pattern of the dequantization pattern may be defined to separate values into at least one section and inversely rearrange the values in each section. In a more concrete example, the inverse pattern of the dequantization pattern may be defined to move a first value to a fourth value, a second value to a third value, the third value to the second value, a fourth value to the first value, a fifth value to an eighth value, a sixth value to a seventh value, the seventh value to the sixth value, and the eighth value to the fifth value.

Figure 10:
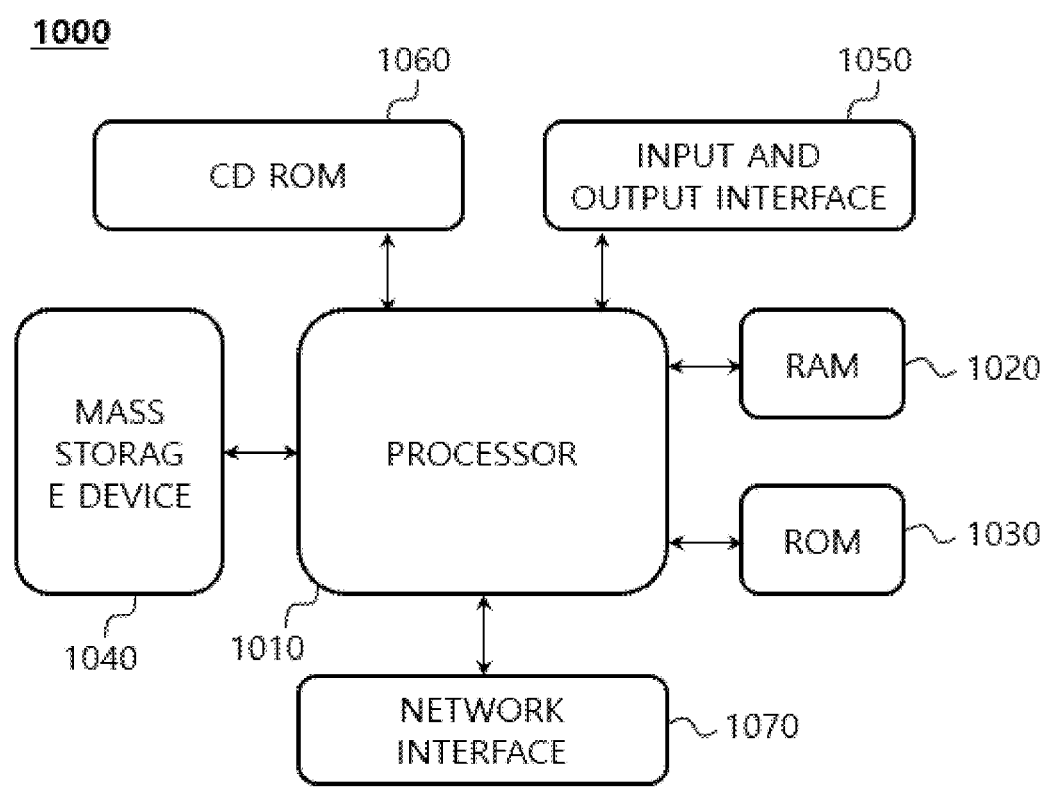
FIG. 10 is a block diagram illustrating the inside of a universal computer device which can be adopted to perform lightweighting of artificial intelligence models according to an embodiment of the disclosure.

Last, FIG. 10 is a block diagram illustrating the inside of a universal computer device which can be adopted to make artificial intelligence model lightweight according to an embodiment of the disclosure. A computer device 1000 includes one or more processor 1010 connected to a main memory device including random access memory (RAM) 1020 and read only memory (ROM) 1030. The processor 1010 may also be called a central processing unit (CPU). The processor is a component for performing a learning method and may be the subject of learning. As widely known in this technical field, the ROM 1030 serves to transmit data and instructions to the CPU unidirectionally, and the RAM 1020 is generally used to transmit data and instructions bidirectionally. The RAM 1020 and the ROM 1030 may include any appropriate form of computer-readable media. A mass storage device 1040 is bidirectionally connected to the processor 1010 to provide additional data storage capabilities, and may be any type of the computer-readable recording media. The mass storage device 1040 is used to store programs, data, and the like, and is an auxiliary storage device such as a hard disk generally slower than the main storage device. A specific mass storage device such as CD ROM 1060 may be used. The processor 1010 is connected to one or more input and output interfaces 1050 such as a video monitor, a trackball, a mouse, a keyboard, a microphone, a touch screen-type display, a card reader, a magnetic or paper tape reader, a voice or writing recognizer, a joystick, or other known computer input and output devices. Last, the processor 1010 may be connected to a wired or wireless communication network through a network interface 1070. Through the network connection, the procedure of the method may be performed. The device and tool are well known to those skilled in the computer hardware and software technology fields.

In the specification (particularly, in the claims) of the disclosure, the term "the" and the indication term similar thereto may correspond to both the singular and the plural. When the range is described in the disclosure, it includes the disclosure applying individual values belonging to the range (unless there is a contrary description), and each individual value constituting the range is as described in the detailed description of the disclosure.

If there is no explicit order or contrary to the steps constituting the method according to the disclosure, the steps may be carried out in a suitable order. The disclosure is not necessarily limited to the described order of the steps. The use of all examples or exemplary terms (for example, etc.) in the disclosure is merely to describe the disclosure in detail, and the scope of the disclosure is not limited by the examples or exemplary terms unless defined by the claims. Further, those skilled in the art appreciates that various modifications, combinations, and changes can be made in accordance with design conditions and factors within the scope of the appended claims or their equivalents.

Therefore, the technical idea of the disclosure should not be limited to the above-described embodiments, and all ranges equivalent to the appended claims or equivalently changed therefrom as well as the appended claims are included in the scope of the spirit of the disclosure.

What is claimed is:

1. A method of performing matrix multiplication of weight values and input values of artificial intelligence models, the method comprising:
    copying, to a register, weight values quantized in an integer form stored in a global memory without a storage process in a shared memory;
    dequantizing the weight values quantized in the integer form to weight values in a floating-point form;
    copying, to the register, an input value matrix comprising input values in the floating-point form; and
    performing matrix multiplication between a weight matrix comprising the dequantized weight values and the input value matrix,
    wherein the quantized weight values are stored in the global memory in a pre-quantized state before an inference calculation.

2. The method of claim 1, wherein the dequantizing of the quantized weight values comprises:
    converting each of the quantized weight values expressed by a first number of bits to be expressed by a second number of bits; and
    changing order of the weight values expressed by the second number of bits according to a dequantization pattern.

3. The method of claim 2, wherein the dequantization pattern is defined to separate values into at least one section and inversely rearrange the values in each section.

4. The method of claim 2, wherein the dequantization pattern is defined to move a first value to a fourth value, a second value to a third value, the third value to the second value, a fourth value to the first value, a fifth value to an eighth value, a sixth value to a seventh value, the seventh value to the sixth value, and the eighth value to the fifth value.

5. The method of claim 2, wherein the quantized weight values stored in the global memory are stored after rearrangement according to an inverse pattern of the dequantization pattern or an inverse pattern of a data input pattern applied when the weight values are copied from the shared memory to the register.

6. The method of claim 5, wherein the inverse pattern of the dequantization pattern is defined to separate values included in one row into at least one section and inversely rearrange the values in each section.

7. The method of claim 5, wherein the inverse pattern of the data input pattern is defined to change rows and columns of values included in a matrix.

8. The method of claim 1, wherein the quantized weight values are stored in the global memory by identifying a storage pattern of the quantized weight values, based on at least one of a data input pattern and a dequantization pattern for matrix multiplication and storing the quantized weight values according to the identified storage pattern.

9. An apparatus for performing matrix multiplication of weight values and input values of artificial intelligence models, the apparatus comprising:
    a storage unit; and
    a processor,
    wherein the processor is configured to:

copy, to a register, weight values quantized in an integer form stored in a global memory without a storage process in a shared memory;

dequantize the weight values quantized in the integer form to weight values in a floating-point form;

copy, to the register, an input value matrix comprising input values in the floating-point form; and perform matrix multiplication between a weight matrix comprising the dequantized weight values and the input value matrix, wherein the quantized weight values are stored in the global memory in a pre-quantized state before an inference calculation.

10. The apparatus of claim 9, wherein the quantized weight values are stored in the global memory by identifying a storage pattern of the quantized weight values, based on at least one of a data input pattern and a dequantization pattern for matrix multiplication and storing the quantized weight values according to the identified storage pattern.

* * * * *